United States Patent Office 2,707,165
Patented Apr. 26, 1955

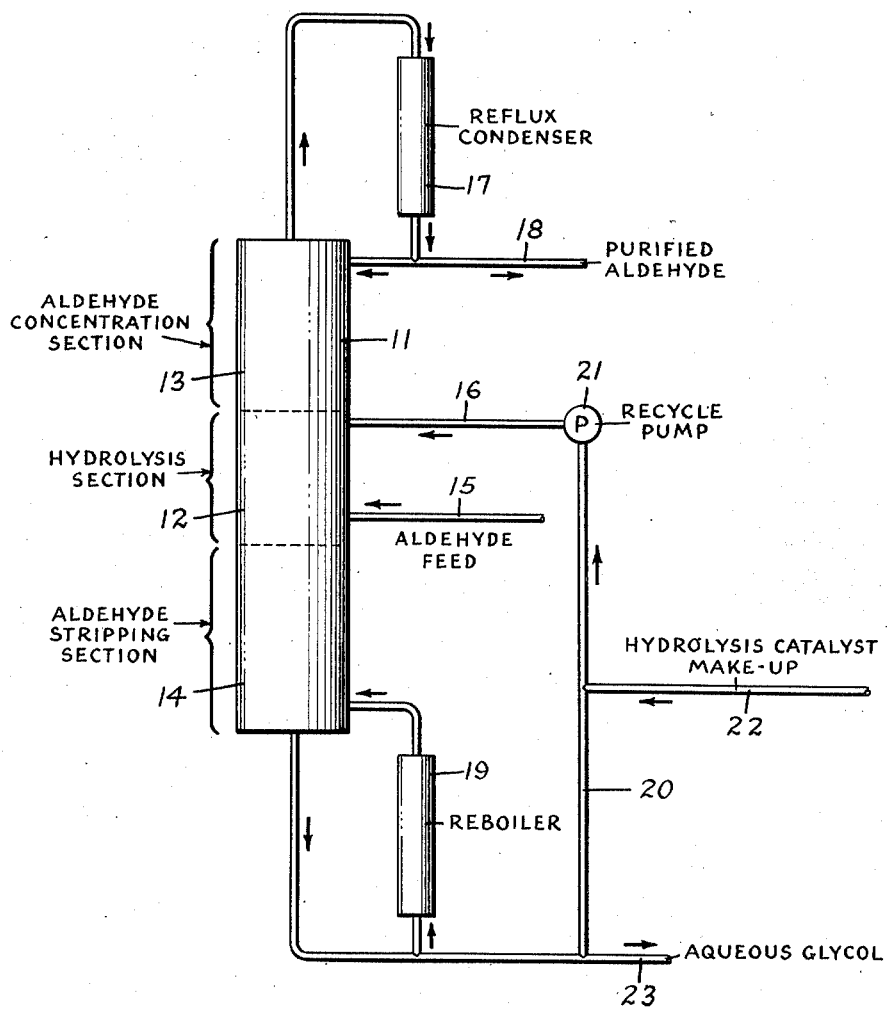

2,707,165

PURIFICATION OF ALDEHYDES

Alexander F. MacLean and Eldred T. Smith, Corpus Christi, Tex., assignors to Celanese Corporation of America, New York, N. Y., a corporation of Delaware Application June 24, 1952, Serial No. 295,232

3 Claims. (Cl. 202—57)

This invention relates to the purification of aldehydes and relates more particularly to a process for the purification of aldehydes containing alkylene oxides as impurities.

When aldehydes, such as acetaldehyde, propionaldehyde and the like, are produced by certain processes, for example, the partial oxidation of propane, butane or other hydrocarbons, they are obtained in admixture with a large number of different oxygenated hydrocarbons including alkylene oxides such as ethylene oxide, propylene oxide and the like. The aldehydes are separated from these other oxygenated materials by a combination of distillation, extraction and similar steps. However, it is found that the aldehydes obtained in this manner contain as impurities small quantities of the alkylene oxides which makes the said aldehydes unsuited for or causes a loss of aldehyde in certain applications.

It is an important object of this invention to provide a process for the purification of aldehydes containing alkylene oxides as impurities.

A further object of this invention is to provide a process for the purification of acetaldehyde containing ethylene oxide as an impurity.

Another object of this invention is to provide a process for the purification of aldehydes containing alkylene oxides as impurities according to which the alkylene oxides are hydrolyzed to glycols and the glycols are separated from the aldehydes by distillation.

Other objects of this invention will be apparent from the following detailed description and claims.

According to the present invention, aldehydes containing alkylene oxides, for example, in concentrations of between about 0.1 and 10.0%, as impurities are treated so as to hydrolize the alkylene oxides to glycols and the glycols are separated from the aldehyde by distillation. An efficient method of carrying out the hydrolysis and separation continuously and in a single piece of apparatus is to introduce the aldehyde and an aqueous solution containing a hydrolysis catalyst such as, for example a strong acid as phosphoric acid, sulfuric acid, hydrochloric acid or toluene sulfonic acid, into the central section of a distillation column. The alkylene oxides hydrolize to glycols in this section of the column and the purified aldehyde is distilled overhead, preferably under reflux to effect a concentration of the aldehyde. An aqueous stream containing the glycol and hydrolysis catalyst moves downwardly through the lower portion of the column where any aldehyde is stripped therefrom and where any polymerized aldehyde is converted to the monomeric aldehyde which is also stripped from said stream. The aqueous stream is preferably recycled to the hydrolysis section of the column, after the addition of a further quantity of hydrolysis catalyst and water if necessary. A portion of the hydrolysis catalyst-containing stream may be withdrawn continuously to prevent a build-up of glycols above about 20% by volume in said stream and said stream may be treated to recover the glycols therefrom.

In carrying out the process of this invention, it has been found that the best results are obtained when the acid hydrolysis catalyst is present in amounts sufficient to hold the pH between about 1 and 3. Aldehyde should be present in amounts ranging from about 1 to 20 mole per cent in the liquid phase in the hydrolysis section. To obtain a substantially complete hydrolysis of the alkylene oxide, the temperature in the hydrolysis section should preferably be maintained at between about 50 and 70° C. in treating acetaldehyde and the residence time of the materials in the hydrolysis section should be greater than about 50 seconds. In the purification of higher aldehydes, such as propionaldehyde, higher column temperatures would be desirable. By residence time is meant the weight of liquid held up in the hydrolysis section of the column divided by the recycle rate in units of weight per minute. The temperature, residence time and hydrogen ion concentration are closely interrelated, a decrease in residence time requiring an increase in the temperature and/or hydrogen ion concentration or vice versa. The reaction may be carried out at atmospheric pressure or subatmospheric pressure. It may also be carried out at superatmospheric pressure, in which case the column may be operated at lower temperatures or with shorter residence times in the hydrolysis section, while still effecting a substantially complete hydrolysis of the alkylene oxides.

The accompanying drawing shows diagrammatically a preferred form of apparatus for carrying out the process of this invention.

Referring now to the drawing, the reference numeral 11 designates a distillation column in which the central portion 12 functions as a hydrolysis section, the upper portion 13 functions as an aldehyde concentration section, and the lower portion 14 functions as an aldehyde stripping section. An aldehyde stream, containing alkylene oxides as an impurity, is introduced into the hydrolysis section 12 through a feed line 15 and an aqueous stream containing a hydrolysis catalyst is introduced into the hydrolysis section 12 through a feed line 16 at a point above that at which the aldehyde stream enters said section. The aldehyde vapors rising from the hydrolysis section 12 pass through the aldehyde concentration section 13 to a reflux condenser 17 wherein the purified aldehyde is condensed. A portion of the purified aldehyde is preferably recycled to the top of the aldehyde concentration section 13, a suitable reflux ratio being between about 1/9 and 10, while the remainder of the purified aldehyde is withdrawn from the system through a line 18.

The aqueous stream containing hydrolysis catalyst and glycols that are formed from the alkylene oxides passes downwardly from the hydrolysis section 12 into the aldehyde stripping section 14. In this section any aldehyde is vaporized and the vapors ascend the column 11. In addition, any aldehyde polymers that may have formed are hydrolyzed back to the monomeric state and this aldehyde is also vaporized and stripped from the aqueous stream. A portion of the aqueous stream flows to a reboiler 19 wherein it is vaporized and the vapor liquid mixtures returned to the base of the column 11 thus supplying steam and heat to the said column. Another portion of the aqueous stream flows through the line 20 to a recycle pump 21 which forces the same through the feed line 16 into the column 11. Any make up of hydrolysis catalyst and water that is necessary is introduced into the aqueous stream, as it flows in the line 20, through a feed line 22. The remainder of the aqueous stream is discharged from the system through a line 23 and may be treated to recover the glycols contained therein.

The following example is given to illustrate this invention further.

*Example*

An acetaldehyde stream containing 1.2% by weight of ethylene oxide is introduced into the apparatus shown in the accompanying drawing, through the feed line 15, at a rate of 10 parts by weight per minute. There is simultaneously introduced into said apparatus through the feed line 16, an aqueous solution containing 5% by weight of phosphoric acid at a rate of 90 parts by weight per minute. The reflux ratio is set at 2 to 1 by adjusting the reflux condenser. After the apparatus reaches equilibrium, an aqueous stream is removed through the line 23 at a rate sufficient to maintain the glycol concentration in the stream flowing through the line 20 at 10% and sufficient water and phosphoric acid are added through the feed line 22 to maintain the water and acid concentrations. The acetaldehyde withdrawn from the column is substantially free from ethylene oxide, analyzing between 0.00 and 0.08% ethylene oxide by weight. The acetaldehyde recovery is 99.6% of the feed.

Having described our invention, what we desire to secure by Letters Patent is:

1. Process for the purification of acetaldehyde containing up to about 10% of ethylene oxide as an impurity, which comprises continuously introducing a stream of said impure acetaldehyde into an intermediate portion of a distillation column, continuously introducing a stream of an acidic hydrolysis catalyst and water into said intermediate portion to hydrolyze the ethylene oxide to ethylene glycol, said streams being introduced at such a rate that the concentration of acetaldehyde in the liquid phase in said intermediate portion is about 1 to 20 mole percent and the pH is 1 to 3 in said intermediate portion, continuously passing the aqueous stream containing the acidic hydrolysis catalyst and ethylene glycol downwardly through the column to strip any acetaldehyde therefrom while continuously distilling the purified acetaldehyde from the upper portion of the column.

2. Process for the purification of acetaldehyde containing up to about 10% of ethylene oxide as an impurity, which comprises continuously introducing a stream of said impure acetaldehyde into an intermediate portion of a distillation column, continuously introducing a stream of an acidic hydrolysis catalyst and water into said intermediate portion, at a point above that at which the acetaldehyde stream is introduced, to hydrolyze the ethylene oxide to ethylene glycol, said streams being introduced at such a rate that the concentration of acetaldehyde in the liquid phase in said intermediate portion is about 1 to 20 mol percent, the residence time in said intermediate portion is above about 50 seconds and the pH is 1 to 3 in said intermediate portion, the temperature in said intermediate portion being maintained between about 50 to 70° C., continuously passing the aqueous stream containing the acid hydrolysis catalyst and ethylene glycol downwardly through the column to strip any acetaldehyde therefrom while continuously distilling the purified acetaldehyde from the upper portion of the column.

3. A process for the purification of acetaldehyde containing 1.2% by weight of ethylene oxide which comprises continuously introducing a stream of said impure acetaldehyde into an intermediate portion of a distillation column at a rate of 10 parts by weight per minute, introducing a stream of an aqueous solution containing 5% by weight of phosphoric acid into said intermediate portion, at a point above that at which the aldehyde stream is introduced, and at a rate of 90 parts by weight per minute to hydrolyze the ethylene oxide to ethylene glycol, the temperature in said intermediate portion being 50 to 70° C., continuously passing the aqueous stream containing the phosphoric acid and ethylene glycol downwardly through the column to strip acetaldehyde therefrom while continuously distilling purified acetaldehyde from the upper portion of the column, continuously drawing off an aqueous stream containing glycol, water and phosphoric acid from the base of said column and continuously recirculating a portion of said withdrawn stream by incorporating it into the aforesaid stream of aqueous phosphoric acid which is introduced into the intermediate portion of the column, the portion of said withdrawn stream which is recirculated being such that the glycol concentration in said withdrawn stream is maintained at 10% during said process.

References Cited in the file of this patent

UNITED STATES PATENTS

| | | |
|---|---|---|
| 2,570,217 | Dice | Oct. 9, 1951 |
| 2,615,901 | McClellan | Oct. 28, 1952 |